United States Patent [19]
Mullins

[11] Patent Number: 5,320,665
[45] Date of Patent: Jun. 14, 1994

[54] METAL RECOVERY PROCESS FROM SOLUTION WITH A STEEL SUBSTRATE

[75] Inventor: Kieran Mullins, Kildare, Ireland

[73] Assignee: Connary Minerals PLC, Dublin, Ireland

[21] Appl. No.: 902,976

[22] Filed: Jun. 23, 1992

[30] Foreign Application Priority Data

Jun. 24, 1991 [IE] Ireland .................. 2171/91

[51] Int. Cl.$^5$ .................................. C22B 3/46
[52] U.S. Cl. .......................... 75/724; 75/732; 75/736
[58] Field of Search .............. 75/736, 724, 712, 732

[56] References Cited

U.S. PATENT DOCUMENTS

| | | | |
|---|---|---|---|
| 3,874,940 | 4/1975 | Vera et al. | 75/730 |
| 4,731,113 | 3/1988 | Little | 75/736 |
| 4,739,973 | 4/1988 | Herndon | 266/168 |
| 4,902,345 | 2/1990 | Ball et al. | 423/27 |
| 5,145,515 | 8/1992 | Gallup et al. | 75/736 |

*Primary Examiner*—Melvyn J. Andrews
*Attorney, Agent, or Firm*—Felfe & Lynch

[57] ABSTRACT

A method for recovering a metal from a metal ore or waste metal-containing material comprises contacting the ore or waste material with an acidic leaching solution effective for leaching and forming a pregnant solution of at least one metal to be recovered, and contacting the pregnant solution with a steel substrate so as to cement the at least one metal and from which one can recover the metal. The method is particularly suited to the recovery of precious metals such as gold. The steel substrate can be particulate, such as steel shavings, so that the steel substrate is used in a form which results in a high surface area to volume ratio of steel.

17 Claims, No Drawings

METAL RECOVERY PROCESS FROM SOLUTION WITH A STEEL SUBSTRATE

FIELD OF THE INVENTION

This invention relates to the recovery of metals and, in particular, to the recovery of noble metals, from varying grades of ore containing such metals.

BACKGROUND AND PRIOR ART

The recovery of noble metals from ore by initially leaching the ore to form metal complexes, followed by a cementation step which results in the concentration of said noble metals, for subsequent recovery thereof by conventional means is known. The solution resulting from the leaching step and containing the metal complexes from which the metal is to be recovered is conventionally known as a pregnant solution. The term cementation refers to the mixing of the pregnant solution with a metal substrate which interacts with the metal complexes to cause their removal from the solution. Cementation normally involves a redox reaction at the surface of the respectively interacting particles. The leaching solution contains at least one lixiviant for the metal to be recovered.

Suitable lixiviants for the extraction of silver and gold include dilute alkaline solutions of sodium cyanide, potassium cyanide, calcium cyanide and acid solutions of thiourea. The cyanide salts, if they are to act as lixiviants, must be maintained at an alkaline pH. The use of an acid pH would result in the generation of hydrogen cyanide which is a highly toxic substance. Thus special handling procedures are a feature of leaching involving the use of cyanide solutions.

Currently, alkaline cyanide solutions are the preferred lixiviants in the recovery of noble metals such as gold.

British Patent Specification No. 1,594,361 describes a process for the extraction of gold and/or silver from ore which is reduced to a particle size of 1 mm or less, in which an alkaline solution of sodium or potassium cyanide is used as lixiviant. the resultant pregnant solution is maintained in an aerated static bed at a temperature in the range 10°–40° C. for a period of 12–48 hours and, thereafter, the particles are washed with water to obtain a solution of gold and/or silver salts which is treated to recover the gold and/or silver metal. An obvious disadvantage of this process is the use of cyanide which is highly toxic and thus there is the danger of pollution of the surrounding environment, especially in systems which are not enclosed viz open systems. The use of cyanide in mining has been barred in certain locations such as in California in the U.S.A. Open systems are typical of the systems used in the recovery of noble metals from low grade ores and from waste dumped ores, especially pyritic ores in which natural oxidation has occurred. Noble metals, for example gold, will not leach from certain unoxidized sulphidic ores which are known as refractory ores.

When the process of British Patent Specification No. 1,594,361 was carried out on a tailings dump of gold workings in South Africa containing 0.56 g Au/tonne a gold extraction of ~57% was achieved.

As indicated above, thiourea is another commonly used lixiviant. Thus, GB 2 181 722 A discloses the use of a lixiviant containing thiourea, urea and an alkaline lignin sulphonate as lixiviant, as an alternative to thiourea alone, in the treatment of ores containing significant quantities of gold, silver and other precious or noble metals, especially low grade ores. The recovery of the dissolved gold and silver from the pregnant solution can be performed using a variety of known techniques, including ion exchange resins, iron-in-pulp processes, lead-in-pulp processes, electrodeposition and carbon adsorption. All of the latter recovery processes are relatively costly, especially those involving activated carbon and ion exchange resin. Also iron being highly reactive tends to go into solution in an acid environment, thus slowing the recovery process and the yield of the metal to be recovered.

British British Patent Specification No. 1,534,485 discloses the uses of thiourea as a lixiviant and cementation with aluminum. The ore is initially leached and the pregnant solution is treated to a number of steps viz flocculation, filtration and washing followed by subjecting the so-treated solution to a heat treatment at a temperature in the range 50°–60° C., prior to cementation with powdered aluminum. It will be appreciated that the process is lengthy and the energy input is high.

British Patent Specification No. 1,437,778, EP-A 0 057 383 and U.S. Pat. No. 3,985,554 disclose various processes involving cementation with various metals, including iron. Thus British Patent Specification No. 1,437,778 discloses the recovery of copper, silver, gold and platinum group metals from acid solution by cementation with various metals, including iron. EP-A 0 057 383 discloses cementation of copper using iron turnings. U.S. Pat No. 3,985,554 discloses recovery of various metals, including gold, from aqueous solution by mixing with iron particles, for example swarf produced by the grinding of ferrous metals. The disadvantages of iron in cementation has been indicated above.

There is a continuing need for processes for the recovery of noble or precious metals from varying grades of ore and various waste materials containing said metals which are environmentally acceptable, are relatively simple and inexpensive to carry out and which result in the recovery of metals which it is desired to recover in high yield.

SUMMARY OF THE INVENTION

The present invention provides a method for recovering a metal from a metal ore or waste material, which comprises contacting the ore or waste material with an acidic leaching solution effective for leaching and forming a pregnant solution of at least one metal to be recovered and contacting said pregnant solution with a steel substrate so as to cement said at least one metal and from which the metal is recoverable.

The use of a steel substrate as the cementation agent has particular advantages, notably a high cementation rate in an acid medium such as thiourea or a derivative thereof as hereinafter defined.

Furthermore, the method according to the invention is essentially a two step method.

DETAILED DESCRIPTION OF PREFERRED EMBODIMENTS

The steel substrate for use in the method according to the invention can take various forms. Thus, the steel substrate can be particulate and includes dusts, pellets, ball bearings and shavings. In the case of steel shavings, these may be obtained, for example, as off-cuts from power saws at minimal cost since such steel shavings are normally considered as a scrap or waste product. If necessary, the steel shavings or other waste steel product used as steel substrate in accordance with the invention can be treated by immersion in trichloroethylene or other suitable solvent for the removal of oil.

Preferably, the steel substrate is used in a form which results in a high surface area to volume ratio of steel. By varying the latter ratio, one can exercise a high degree of control over the method according to the invention as a whole.

Thus, the steel substrate can also be a mesh or a wool.

The surface area of the steel can be increased by pre-conditioning the steel, such as by etching. Generally, the surface area of the steel substrate can be increased by ridging thereof.

The leaching solution can be a solution of thiourea or a derivative thereof. By derivatives of thiourea as used herein is meant inter alia thiosemicarbazide, thiosulphate, thiocarbamates, phenyl thiourea and other alkyl and aryl derivatives of thiourea (thiocarbamide).

Preferably, the acidic leaching solution is an aqueous solution with a pH in the range 1-3, more especially 1.5-2.5. The pH of the solution is adjusted by means of sulphuric acid or any other suitable acid.

The preferred lixiviant for use in accordance with the invention is thiourea per se.

The concentration of the thiourea in the leaching solution will normally be in the range 0.1-10.0 g/liter.

As indicated above, the length of time for carrying out the method according to the invention can be varied by varying the surface area of the steel substrate. However, preferably, the residence time of the leaching solution with the steel substrate is less than eight hours. The short through-put time that can be availed of by using the method in accordance with the invention leads to less degradation of thiourea when such is used as the lixiviant.

The ore can be crushed before leaching to a desired particle size. However, such crushing or other particle size reduction is not essential for carrying out the method of the invention.

The method according to the invention can be carried out in an open system or in an enclosed system or a combination thereof.

Furthermore, the method according to the invention can be carried out in continuous or batchwise fashion.

As indicated above, the ore used can be a high grade ore or a low grade ore depending on the quantity of base or noble metal contained therein to be recovered. The method can also be used on ore tailings, otherwise known as mine tailings or dumps, hereinafter referred to as tailings. High recovery of gold from tailings can be achieved with the method according to the invention as hereinafter described in the Examples. Generally, the net yields of noble metal per unit weight is less for low grade ores than for high grade ores. Furthermore, there is more base metal material present in low grade low grade ore which tends to interfere with the various processing stages. Thus, in the case of gold recovery, the gold be readily recovered in high yield from naturally oxidized sulphide rich ore, conventionally known as sulphide ore, including sulphidic ores containing pyrite, arsenopyrite or chalcopyrite or other metal sulphides.

In the case of high grade ore, the method will normally, but not essentially, be carried out in an enclosed system. Agitation of the leaching solution and ore will be a normal requirement of an enclosed system, in order to maximise contact of the ore and lixiviant.

The method according to the invention, being environmentally acceptable, can be readily carried out in an open system, such as on an ore heap. In the latter system, the leaching solution can be percolated through the ore heap in conventional manner. The pregnant solution is then passed over the steel substrate having been conveyed to the locus where the steel substrate is situated. The two operations are carried out sequentially, but may occur at relatively spaced-apart locations.

In general, the ore can be any form of ore in which the metal to be recovered is available for leaching.

Likewise, the waste metal-containing material can be any such waste material in which the metal to be recovered is available for leaching. Such waste materials include metal scrap, and industrial, scientific or electronic waste. For example, electronic circuits contain gold which it is desirable to recover for further use.

The ore can be in the form of a slurry which is desirable in certain circumstances. In general, the use of a slurry is not economical in the case of noble metal recovery from low grade ores. However, the method according to the invention enables one to obtain high yields of noble metal economically from low grade ore.

The ore can be pre-treated i.e. pre-conditioned prior to the leaching step. For example, an agglomerating agent can be used to maintain the porosity of the ore during leaching. When the method of the invention is carried out on an ore heap it is important to maintain the permeable matrix structure of the heap.

Where the ore material is essentially finely divided or contains a proportion of finely divided material such as clay, referred to in the industry as "slimes", then it may be desirable to physically stabilise the heap by agglomeration so that the lixiviant can percolate through the heap in a uniform manner, while preserving the permeability and porosity of the heap, thereby, allowing contact between the lixiviant and the gold to be leached.

Other pre-conditioning treatments include treatment with agents which set up an equilibrium reaction between the noble metal complexes and the thiourea so as to avoid the consumption of excessive amounts of thiourea in the leaching process and, thereby, optimise the leaching conditions.

Thus, pre-conditioning/pre-treatment of the ore concerns both the chemical and physical nature of the ore.

Various auxiliary agents can be used in the leaching solution so as to optimise the leaching conditions and recycling of the leaching solution. Thus, various additional compounds can be used to optimise equilibrium conditions, to increase the specificity of the metal complexing and to prevent the breakdown of the thiourea. Such compounds include inter alia ferric sulphate, hydrogen peroxide, sodium metabisulphite and formamadine disulphide.

Whereas it is known to add sodium metabisulphite to a leaching solution containing thiourea as a lixiviant, it has now been found that adding a separate amount of sodium metabisulphite to the pregnant solution, resulting from the leaching step, prior to contact with the steel substrate, greatly enhances the rate of cementation and minimises the breakdown of thiourea, thereby, reducing the amount of thiourea consumed in the overall method. The addition of sodium metabisulphite prior to contact with the steel substrate also decreases the amount of steel dissolved during the cementation step, as normally there will be some dissolution of the steel in the highly acidic environment of the leaching solution. The sodium metabisulphite is preferably used in an amount of up to 3 g/liter.

Following cementation, the leaching solution is preferably recycled for use in the leaching step, following removal of the steel substrate therefrom.

Depending on the type of method used, the lixiviant can be separated from the loaded steel substrate, optionally following a residence time in a settling tank, by decanting or in any other conventional manner known to one skilled in the art.

Following the cementation step, one obtains a sulphide sludge which can optionally be maintained in contact with the steel substrate and sent as such for smelting. However, more generally, the metal of interest will be recovered from the steel substrate on site.

The steel substrate can be recovered and recycled for use in the method according to the invention or, alternatively, be degraded. In either alternative, nitric acid will normally be the agent of choice and the end result will be determined by the strength of the acid used. Thus, to lift off the metal sulphide complex from the steel substrate without dissolving the latter, one can use 0.5M nitric acid. However, if dissolution of the steel is required, it would be necessary to use 1M nitric acid or higher strength nitric acid. The resultant metal-sulphide sludge in either case is sent for smelting for recovery of the desired metal, following separation of the steel, as required, when the steel is not dissolved in the acid treatment step.

Alternatively, the sludge can be smelted or cupellated on site to produce a highly concentrated product, known conventionally as doré when the principal metal to be recovered is gold, which is then sent to a refinery.

The pregnant solution can be passed through more than one locus containing the steel substrate, including a locus commonly referred to as a scavenging vessel, so that the metal complexes containing the metal to be recovered are progressively removed from the pregnant solution.

Furthermore, in the processing of a given batch of ore in accordance with the invention a given amount of steel substrate may be subjected to more than one pass of pregnant solution until it is saturated/fully loaded with the cementing metal complex.

The invention will be further illustrated by the following Examples.

EXAMPLE 1

Gold was recovered from a naturally oxidized pyritic ore from disused mines at Avoca, County Wicklow, Ireland in accordance with the invention using a co-current cementation system.

The ore was leached in a slurry form in a 20,000 liter cylindrical capacity tank fitted with an impeller using thiourea as the main leaching agent. Specifically, ore (1.9 tonnes) having an average particle size less than 0.85 mm was mixed thoroughly with mine water (18.8 $m^3$), thiourea (19 Kg), ferric sulphate (42 Kg (45% w/w)) solution and sodium metabisulphite (24 Kg). Concentrated sulphuric acid was added to achieve a starting pH of ~2.0. The mixture was agitated for 1 hour during which time leaching took place. The plant will normally have up to six such tanks.

The pregnant solution resulting from the leaching step, to which additional sodium metabisulphite (0.5 g/liter) was added, was passed through to a rotating drum where cementation of the solubilized metals with steel substrate (20 Kg) took place. The steel substrate used was steel shavings. Processed slurry exited from the outflow end of the drum with the steel shavings. The shavings were captured by a wet magnetic separator and returned to the in-flow end of the drum. The slurry was then recycled to the cylindrical tank. The method was allowed to proceed for 8 hours after which the shavings were collected and washed.

The use of the rotating drum prevents the settling of the heavier particles characteristic of static systems and enhances the cementation process.

The collected shavings were mixed with a solution of 500 liters of 1M nitric acid at 35° C. for 1 hour after which any remaining residue was retained and washed with water. Throughout, the pH, temperature and potential are monitored so as to monitor the progress of the gold recovery.

The results are shown in Tables 1A and 1B.

TABLE 1A

| Ore values | Gold grade (mg/Kg ore) | Gold available (g) | Gold recovered on steel (g) | % Gold recovered |
|---|---|---|---|---|
| Initial | 1.985 | 3.77 | — | — |
| Final | 0.218 | — | 3.106 | 82.4% |

TABLE 1B

| Steel values | Weight of steel (Kg) | Gold grade on steel or residue (mg/Kg) | Gold recovered on steel (g) | Total % gold recovered |
|---|---|---|---|---|
| Initial | 20.00 | — | — | — |
| Final | 13.91 | 223.3 | 3.106 | 82.4% |
| After HNO$_3$ wash | 1.113 | 2,735 | 3.044 | 80.7% |

EXAMPLE 2

Example 1 was repeated, except that no sodium metabisulphite was added to the cementation stage and the nitric acid dissolution step was not carried out.

The results are shown in Table 2.

TABLE 2

| Ore values | Gold grade (mg/Kg ore) | Gold available (g) | Gold recovered on steel (g) | % Gold recovered |
|---|---|---|---|---|
| Initial | 1.985 | 3.77 | — | — |
| Final | 0.487 | — | 2.731 | 72.4% |

EXAMPLE 3

A laboratory scale experiment was carried out to demonstrate how leaching solutions percolating through ore heaps and filtered/flocculated leaching solutions resulting from agitated/vat leaching systems can be processed using a steel cementation substrate.

A 500 ml 'leaching' solution was prepared containing gold (0.877 mg/liter), thiourea (0.25 g), formamadine disulphide (0.125 g), sodium metabisulphite (0.125 g) and mine water. Sufficient sulphuric acid (0.01M) was added so as to achieve a starting pH ~2.0.

Steel shavings (0.5 g) were added to a glass column (10 mm × 30 cm) and the leaching solution was pumped through the column over a period of 1 hour.

The results are shown in Table 3.

TABLE 3

| Initial conc. of gold (mg/l) | Final conc. of gold (mg/l) | Gold loading on steel (mg/Kg) | % Gold recovered from solution | % Gold recovered on steel |
|---|---|---|---|---|
| 0.877 | 0.061 | 816 | 93.0 | 93.0 |

EXAMPLE 4

The procedure of Example 3 was repeated, but no sodium metabisulphite was used.

The results are shown in Table 4.

TABLE 4

| Initial conc. of gold (mg/l) | Final conc. of gold (mg/l) | Gold loading on steel (mg/Kg) | % Gold recovered from solution | % Gold recovered on steel |
|---|---|---|---|---|
| 0.877 | 0.109 | 766 | 87.6 | 87.6 |

What I claim is:

1. A method for recovering a precious metal from a material selected from the group consisting of a metal ore and waste metal material, which method consists essentially of the steps:
    (a) contacting the ore or waste material with an aqueous acidic leaching solution containing as lixiviant a compound selected from the group consisting of thiourea and a derivative thereof effective for leaching and forming a pregnant solution of at least one precious metal to be recovered, said precious metal being capable of forming a complex with said thiourea or a derivative thereof;
    (b) adding an effective amount of sulfur dioxide or a sulfur dioxide generating compound to the pregnant solution prior to contact with the steel substrate, so as to increase the rate of cementation and minimize the breakdown of lexiviant; and
    (c) contacting said pregnant solution with a steel substrate so as to cement said precious metal and from which the precious metal is recoverable.

2. A method according to claim 1, wherein the steel substrate is particulate.

3. A method according to claim 2, wherein the particulate steel is selected from the group consisting of a dust, pellets, ball bearings and shavings.

4. A method according to claim 1, wherein the steel substrate is selected from the group consisting of a mesh and a wool.

5. A method according to claim 1, wherein the steel is preconditioned by etching.

6. A method according to claim 1, wherein the surface area of the steel substrate is increased by ridging.

7. A method according to claim 1, wherein the residence time of the leaching solution with the steel substrate is less than 8 hours.

8. A method according to claim 1, which is carried out in an enclosed system.

9. A method according to claim 1, which is batchwise.

10. A method according to claim 1, which is continuous.

11. A method according to claim 1, wherein the ore leached is an ore heap.

12. A method according to claim 1, wherein the ore leached is ore tailings.

13. A method according to claim 1, wherein the steel substrate is recycled following dissociation of the metal to be recovered.

14. A method according to claim 1, wherein the sulfur dioxide generating compound rate of cementation and minimize the breakdown of lixiviant.

15. A method according to claim 1, wherein the precious metal to be recovered is a noble metal.

16. A method according to claim 15, wherein the noble metal is gold.

17. A method according to claim 2, wherein the residence time of the leaching solution with the steel substrate is less than 8 hours.

* * * * *